UNITED STATES PATENT OFFICE.

JOHN H. MILLER, OF MOUNT UNION, PENNSYLVANIA.

IMPROVEMENT IN COMPOSITION RUBBERS FOR MILLSTONES.

Specification forming part of Letters Patent No. 179,719, dated July 11, 1876; application filed June 12, 1876.

*To all whom it may concern:*

Be it known that I, JOHN H. MILLER, of Mount Union, in the county of Huntingdon and State of Pennsylvania, have invented a new and Improved Composition Rubber for Millstones, of which the following is a specification:

My improved burr-millstone rubber consists of soft fire-clay, about nine (9) parts; silver-sand, one (1) part; and ground emery, four one-hundredths ($\frac{4}{100}$) parts, prepared as follows: The fire-clay is first ground; the silver-sand and emery are then added, and a sufficient quantity of water to mix and prepare the mass for molding; it is molded into the form required, and dried and baked.

The object is to make a rubber for smoothing and truing the face and working out the furrows of millstones that will be more efficient and less liable to glaze than the burr-rubbers commonly used.

I do not limit myself to the exact proportions, as I may vary them to some extent with good results.

Having thus described my invention, I claim as new and desire to secure by Letters Patent—

The combination of fire-clay, silver sand, and ground emery, substantially in the proportions and manner stated.

JNO. H. MILLER.

Witnesses:
H. E. SHAFFER,
A. R. MCCARTHY.